(12) United States Patent
Sekizuka

(10) Patent No.: US 11,318,903 B2
(45) Date of Patent: May 3, 2022

(54) VEHICLE OCCUPANT PROTECTION DEVICE

(71) Applicant: TOYOTA JIDOSHA KABUSHIKI KAISHA, Aichi-ken (JP)

(72) Inventor: Makoto Sekizuka, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 295 days.

(21) Appl. No.: 16/751,243

(22) Filed: Jan. 24, 2020

(65) Prior Publication Data
US 2020/0269790 A1    Aug. 27, 2020

(30) Foreign Application Priority Data

Feb. 25, 2019    (JP) .............................. JP2019-032189

(51) Int. Cl.
| | |
|---|---|
| *B60R 21/00* | (2006.01) |
| *B60R 21/015* | (2006.01) |
| *B60R 11/04* | (2006.01) |
| *B60R 21/16* | (2006.01) |
| *B60R 22/34* | (2006.01) |
| *B60R 22/48* | (2006.01) |
| *B60R 21/01* | (2006.01) |

(52) U.S. Cl.
CPC .............. *B60R 21/00* (2013.01); *B60R 11/04* (2013.01); *B60R 21/01512* (2014.10); *B60R 21/01554* (2014.10); *B60R 21/16* (2013.01); *B60R 22/34* (2013.01); *B60R 22/48* (2013.01); *B60R 2021/0004* (2013.01); *B60R 2021/01286* (2013.01); *B60R 2300/8006* (2013.01)

(58) Field of Classification Search
None
See application file for complete search history.

(56) References Cited

U.S. PATENT DOCUMENTS

| | | | |
|---|---|---|---|
| 10,946,827 B2* | 3/2021 | Yoshikawa | ....... B60R 21/01538 |
| 2007/0289799 A1* | 12/2007 | Aoki | .................. G06K 9/00201 |
| | | | 180/271 |

(Continued)

FOREIGN PATENT DOCUMENTS

| | | | | |
|---|---|---|---|---|
| DE | 102006048350 A1 | | 4/2008 | |
| DE | 102015210438 A1 | * | 5/2016 | ....... B60R 21/01554 |

(Continued)

*Primary Examiner* — Nicole T Verley
(74) *Attorney, Agent, or Firm* — Hauptman Ham, LLP

(57) ABSTRACT

A vehicle occupant protection device includes a seat belt device having a variable force limiter mechanism that can change a force limiter load that an occupant who is sitting on a vehicle seat receives from a seat belt at a time of a frontal collision of a vehicle, an airbag device that deploys an airbag toward the front of the occupant at the time of the frontal collision, a seating position detection unit that detects a seating position at which the occupant is seated, and a control unit that reduces the force limiter load if, compared to a case in which the occupant is positioned within a standard seating region, the seating position of the occupant detected by the seating position detection unit is further toward a vehicle rear than the standard seating region and is within an airbag protection region in which the occupant is protected by the airbag.

9 Claims, 6 Drawing Sheets

(56) References Cited

U.S. PATENT DOCUMENTS

| | | | |
|---|---|---|---|
| 2012/0101688 A1* | 4/2012 | Sugiyama | ............... B60R 21/18 |
| | | | 701/45 |
| 2016/0257273 A1 | 9/2016 | Tada | |
| 2018/0236971 A1 | 8/2018 | Ohachi et al. | |
| 2019/0193665 A1 | 6/2019 | Jimenez et al. | |

FOREIGN PATENT DOCUMENTS

| | | | | |
|---|---|---|---|---|
| DE | 102016102897 A1 * | 9/2016 | ....... | B60R 21/01554 |
| DE | 102018202450 A1 * | 8/2018 | ........... | B60N 2/6673 |
| DE | 102019208417 A1 * | 12/2020 | ........... | B60R 21/231 |
| EP | 3363691 A1 | 8/2018 | | |
| EP | 3705349 A1 * | 9/2020 | .............. | B60R 11/04 |
| JP | 200139269 A | 2/2001 | | |
| JP | 2013-103603 A | 5/2013 | | |
| JP | 2016-165994 A | 9/2016 | | |
| JP | 2018-75877 A | 5/2018 | | |
| JP | 2018-131168 A | 8/2018 | | |
| JP | 2019177777 A * | 10/2019 | .............. | B60N 2/002 |
| JP | 2019177779 A * | 10/2019 | | |
| JP | 2019177780 A * | 10/2019 | ....... | B60R 21/01512 |
| JP | 2020152206 A * | 9/2020 | ........... | B60R 21/231 |
| WO | 03059707 A1 | 7/2003 | | |

\* cited by examiner

VEHICLE OCCUPANT PROTECTION DEVICE

CROSS-REFERENCE TO RELATED APPLICATION

This application is based on and claims priority under 35 USC 119 from Japanese Patent Application No. 2019-032189 filed on Feb. 25, 2019, the disclosure of which is incorporated by reference herein.

BACKGROUND

Technical Field

The present disclosure relates to a vehicle occupant protection device.

Related Art

In the vehicle occupant protection device described in Japanese Patent Application Laid-Open No. 2013-103603, a passenger seat, which is a movable seat, is provided so as to be movable between an airbag protection region and a non airbag-protection region. A seat belt retractor makes a force limiter load a low load if the passenger seat is located in the airbag protection region, and makes the force limiter load a high load if the passenger seat is located in the non airbag-protection region. In this manner, an occupant is protected by an optimum restraining force by switching the force limiter load of a seat belt in accordance with the region where the passenger seat is located.

In the above-described prior art, as a non airbag-protection region that switches the force limiter load to a high load, a region where the airbag does not restrain the passenger in the passenger seat at all, that is, a state in which the passenger seat has been slid to the position of a rear seat, is set. However, even within the airbag protection region where the airbag restrains a passenger seat occupant, the distance between the passenger seat occupant and the airbag varies depending on a front-rear slide position and a reclining angle of the passenger seat. This point is not considered in the above prior art. Further, in the above prior art, although an amount of forward movement of the passenger seat occupant is reduced by switching the force limiter load to a high load, the load received from a seat belt at the chest region of the passenger seat occupant increases due to switching to the high load. For this reason, there is room for improvement from the viewpoint of improving passenger protection performance.

SUMMARY

In view of the above-described facts, an object of the present disclosure is to provide a vehicle occupant protection device that can improve occupant protection performance at the time of a frontal collision.

The vehicle occupant protection device according to a first aspect of the present disclosure includes: a seat belt device having a variable force limiter mechanism that is capable of changing a force limiter load that an occupant who is sitting on a vehicle seat receives from a seat belt at a time of a frontal collision of a vehicle; an airbag device that deploys an airbag in front of the occupant at the time of the frontal collision; a seating position detection unit that detects a seating position of the occupant; and a control unit that reduces the force limiter load if, compared to a case in which the occupant is positioned within a standard seating region, the seating position of the occupant detected by the seating position detection unit is further toward a vehicle rear than the standard seating region and is within an airbag protection region in which the occupant is protected by the airbag.

According to the first aspect, the variable force limiter mechanism included in the seat belt device can change the force limiter load that the occupant who is sitting on the vehicle seat receives from the seat belt at the time of a frontal collision of the vehicle. Further, the airbag device deploys the airbag toward the front of the occupant during a frontal collision of the vehicle, and the seating position detection unit detects the seating position where the occupant is seated. The control unit reduces the force limiter load if, compared to a case in which the occupant is positioned within a standard seating region, the seating position of the occupant detected by the seating position detection unit is further toward a vehicle rear than the standard seating region and is within an airbag protection region in which the occupant is protected by the airbag. In other words, since a larger amount of forward movement of the occupant with respect to the vehicle (that is, impact absorption stroke) can be ensured in a case in which the seating position of the occupant is further to the vehicle rear than the standard seating region, than a case in which the seating position of the occupant is within the standard seating region, the control unit reduces the force limiter load. As a result, since the load that the chest region of the occupant receives from the seat belt is reduced, occupant protection performance can be improved.

In the vehicle occupant protection device according to a second aspect of the present disclosure, in the first aspect, the vehicle is an autonomous driving vehicle that is capable of switching between automatic driving and manual driving, the occupant is a driver of the autonomous driving vehicle, and the control unit detects the standard seating region based on the seating position of the occupant during manual driving.

In the second aspect, the control unit detects the standard seating region of the occupant based on the seating position when the occupant, that is, the driver of the autonomous driving vehicle (autonomous car), is manually driving the vehicle. When the autonomous driving vehicle is automatically driving, the occupant can take a relaxed and comfortable posture further to the vehicle rear than the standard seating region. In this case, the force limiter load is reduced as compared with the case to the case in which the occupant is positioned in the standard seating region. As a result, even when a frontal collision occurs during automatic driving, the load that the occupant's chest region receives from the seat belt is reduced.

In the vehicle occupant protection device according to a third aspect of the present disclosure, in the second aspect, the seating position detection unit detects at least one of a front-rear slide position of the vehicle seat or a reclining angle of the vehicle seat in which the occupant is seated, and the control unit detects a position of a head of the occupant based on a detection result of the seating position detection unit.

In the third aspect, at least one of the front-rear slide position of the vehicle seat or the reclining angle of the vehicle seat is detected by the seating position detection unit, and the control unit detects the position of the head of the occupant based on the detection result. Thereby, the position of the head of the occupant can be detected with a simple configuration.

In the vehicle occupant protection device according to a fourth aspect of the present disclosure, in the third aspect, the control unit reduces the force limiter load in accordance with an increase in a distance in the vehicle front-rear direction between an interior component positioned in front of the occupant and the head of the occupant.

In the fourth aspect, when the distance in the vehicle front-rear direction between the interior component located in front of the occupant and the head of the occupant increases, the force limiter load is reduced in accordance with the increase. That is, since the force limiter load is reduced in accordance with the increase in the impact absorption stroke described above, the impact absorption amount can be kept constant.

In the vehicle occupant protection device according to a fifth aspect of the present disclosure, in the fourth aspect, the seating position detection unit detects both the front-rear slide position and the reclining angle, and the control unit sets the force limiter load higher in a case in which the increase in the distance is due to an increase in the reclining angle than in a case in which the increase in the distance is due to the front-rear slide position moving toward a vehicle rear in the vehicle front-rear direction.

In the fifth aspect, the force limiter load is set higher in the case in which the increase in the distance in the vehicle front-rear direction between the interior component located in front of the occupant and the head of the occupant is due to the increase in the reclining angle of the vehicle seat than in the case in which the increase in the distance is due to the front-rear slide position moving toward a vehicle rear in the vehicle front-rear direction (sliding to the vehicle rear). In other words, since the load that the chest region of the occupant receives from the seat belt at a time of frontal collision lowers when the reclining angle of the vehicle seat is increased, the occupant restraining force of the seat belt can be improved, while ensuring occupant protection performance, by setting the force limiter load higher in the manner described above.

In the vehicle occupant protection device according to a sixth aspect of the present disclosure, in the fourth aspect, the seating position detection unit detects at least the front-rear slide position, and the control unit estimates a physical size of the occupant based on the front-rear slide position during manual driving and corrects a detection result of the position of the head of the occupant based on the estimated physical size.

In the sixth aspect, the control unit estimates the physical size of the occupant based on the front-rear slide position of the vehicle seat during manual driving, and corrects the detection result of the position of the head of the occupant based on the estimated physical size. Thereby, it becomes possible to change the force limiter load more finely in accordance with the physical size of the occupant.

As described above, in the vehicle occupant protection device according to the present disclosure, it is possible to improve the occupant protection performance during a frontal collision.

BRIEF DESCRIPTION OF THE DRAWINGS

Exemplary embodiments of the present disclosure will be described in detail based on the following figures, wherein.

DETAILED DESCRIPTION

Hereinafter, a vehicle occupant protection device 10 according to the embodiment of the present disclosure is described by using FIG. 1 through FIG. 6. Note that arrow FR and arrow UP that are shown appropriately in the respective drawings indicate the forward direction (advancing direction) and the upward direction of a vehicle, respectively. Hereinafter, when description is given by merely using front-rear and vertical directions, these refer to the front-rear of the vehicle front-rear direction and the vertical of the vehicle vertical direction, unless otherwise specified.

(Structure)

Figure 1:
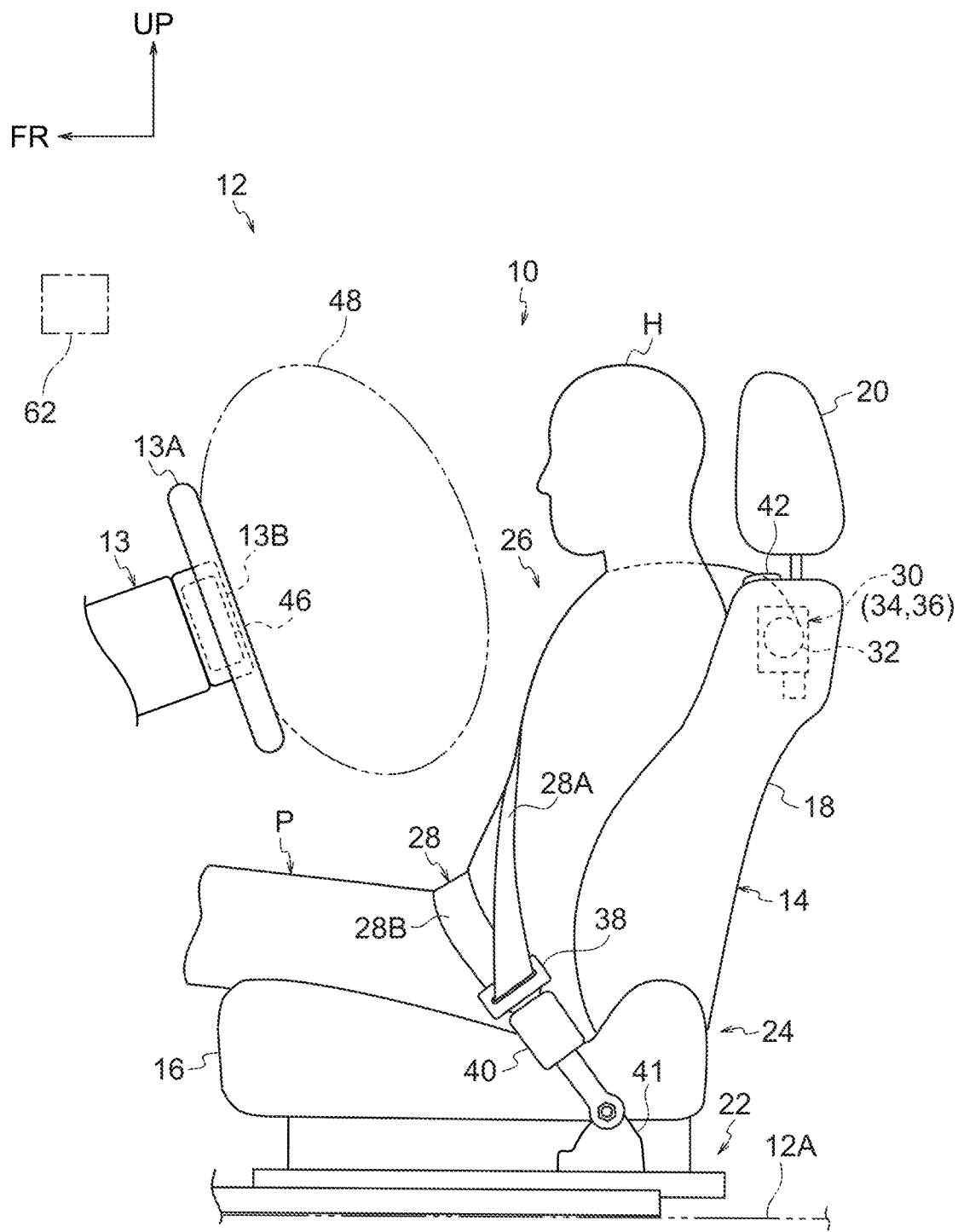
FIG. 1 is a side view showing a configuration around a driver seat in an autonomous driving vehicle to which a vehicle occupant protection device according to an embodiment of the present disclosure is applied.
Figure 2:
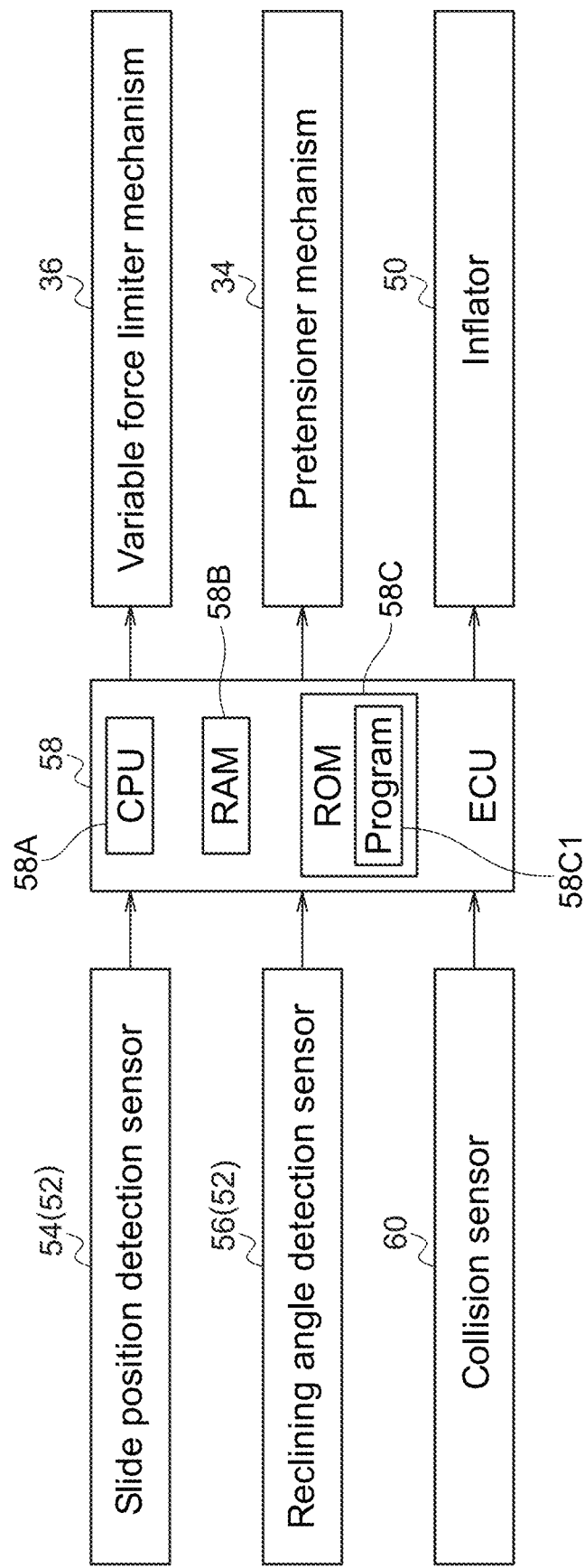
FIG. 2 is a block diagram showing a configuration of a vehicle occupant protection device according to the embodiment of the present disclosure.

As shown in FIGS. 1 and 2, the vehicle occupant protection device 10 according to the embodiment of the present disclosure includes a seat belt device 26, an airbag device 46, a seating position detection unit 52, and an Electronic Control Unit (ECU) 58 as a control unit. The vehicle 12 to which the vehicle occupant protection device 10 is applied is an autonomous driving vehicle (autonomous car) 12 that can be switched between manual driving and automatic driving (hereinafter also simply referred to as "vehicle 12"). This vehicle 12 is equipped with an automatic driving device (not shown).

The automatic driving device includes an automatic driving control ECU that performs control of automatic driving of the vehicle 12 and control of switching between automatic driving and manual driving. The automatic driving control ECU is coupled to a high-accuracy map information ECU, an external sensor, an internal sensor, an actuator, auxiliary devices, a Human Machine Interface (HMI), and the like (none of which are shown).

The high-accuracy map information ECU acquires position information of the vehicle 12 from map information and GPS information. The external sensor detects peripheral information of the vehicle 12, and detects imaging information of a vehicle exterior camera, obstruction information of a radar, obstruction information of Laser Imaging Detection and Ranging (LIDER) and the like as peripheral information of the vehicle 12. The internal sensor detects a running state of the vehicle 12, and includes at least one of a vehicle speed sensor, an acceleration sensor, or a yaw rate sensor. The actuator drives the accelerator, brakes, steering, and the like of the vehicle 12. The auxiliary devices include a headlamp, a brake lamp, a direction indicator lamp, a wiper device, and the like of the vehicle 12. The HMI is an interface for inputting and outputting information between an occupant of the vehicle 12 and the automatic driving device, and includes a display, a speaker, a touch panel, a voice input device, and the like.

The automatic driving control ECU performs an automatic driving control process to control the operation of the actuator and the auxiliary devices based on output from the high-accuracy map information ECU, the external sensor, the internal sensor, and the HMI. In this automatic driving control process, a travel plan along a preset destination route is generated based on the peripheral information of the vehicle 12 and the map information, and driving of the vehicle 12 is controlled such that the vehicle 12 travels independently according to the generated travel plan.

In the vehicle occupant protection device 10 applied to the vehicle 12 described above, an occupant (driver) P seated in a vehicle seat 14, which is the driver's seat of the vehicle 12, is configured to be protected (restrained) by the seat belt device 26 and the air bag device 46 at the time of a frontal collision of the vehicle 12.

The vehicle seat 14 is disposed at the right-hand side of the front part of the vehicle interior. The vehicle seat 14 is provided with a seat cushion 16 on which the occupant P is seated, a seat back 18 that is tiltably supported at a rear end portion of the seat cushion 16, and a headrest 20 that is supported at an upper end portion of the seat back 18 such that the height of the headrest 20 is adjustable. The front-rear, left-right, and vertical directions of the vehicle seat 14 are consistent with the front-rear, left-right, and vertical directions of the vehicle 12. In addition, in a case in which the vehicle seat 14 is disposed at the left-hand side of the front part of the vehicle interior, the configuration is symmetrical to that of the present embodiment.

The seat cushion 16 is connected to a floor portion 12A of the vehicle 12 via a slide mechanism 22 for adjusting a front/rear slide position of the vehicle seat 14. The rear end portion of the seat cushion 16 is connected to a lower end portion of the seat back 18 via a reclining mechanism 24 for adjusting a reclining angle of the seat back 18. The slide mechanism 22 is configured to slide the vehicle seat 14 back and forth with respect to the floor portion 12A by a driving force of a motor, and the reclining mechanism 24 is configured to tilt the seat back 18 around the lower end portion of the seat back 18 by the driving force of the motor. It should be noted that the slide mechanism 22 and the reclining mechanism 24 may be manually operated.

The seat belt device 26 applied to the vehicle seat 14 includes a three-point seat belt (webbing) 28, a retractor (webbing take-up device) 30, a tongue 38, and a buckle 40. The retractor 30 is disposed at an upper portion of the seat back 18, and the buckle 40 is disposed on a side (here, on the left-hand side) of the vehicle seat 12.

One end (not shown) of the seat belt 28 is locked to an anchor plate (not shown) that is fixed to the seat cushion 16 or the slide mechanism 22 on the right-hand side of the vehicle seat 14, and the other end of the seat belt 28 is locked to a take-up shaft 32 of the retractor 30. The retractor 30 is fixed to a frame (not shown) of the seat back 18.

A belt guide 42 having a long hole (not shown) is attached to the upper end portion of the seat back 18, and the other end portion of the seat belt 28 is passed through the long hole of the belt guide 42. An intermediate portion of the seat belt 28 is passed through a long hole (reference number omitted) formed in the tongue 38. As a result, the tongue 38 is slidably attached to the intermediate portion of the seat belt 28. The buckle 40 is disposed on a side (here, on the left-hand side) of the seat cushion 16 and is connected to the slide mechanism 22 via a bracket 41.

When the tongue 38 is connected to the buckle 40, the occupant P is in a state in which the seat belt 28 is fastened. In this seat belt wearing state, a portion of the seat belt 28 from the belt guide 42 to the tongue 38 is a shoulder belt 28A that restrains from the shoulder region to the abdomen region of the occupant P, and a portion of the seat belt 28 from the tongue 38 to the anchor plate is a lap belt 28B that restrains the waist region of the occupant P.

The retractor 30 includes a pretensioner mechanism 34 and a variable force limiter mechanism 36. The pretensioner mechanism 34 is configured to forcibly rotate the take-up shaft 32 in one direction around axis (the take-up direction in which the seat belt 28 is taken-up) at the time of a frontal collision of the vehicle 12. The pretensioner mechanism 34 is, for example, an explosive-type pretensioner mechanism, and the configuration is such that the seat belt 28 is forcibly wound around the take-up shaft 32 (drawn into the retractor 30) by only a predetermined amount by rotation of the take-up shaft 32 caused by ignition of the explosive. Operation of the pretensioner mechanism 34 is controlled by an ECU 58 described later.

The variable force limiter mechanism 36 allows rotation around the axis of the take-up shaft 32 in the other direction around the axis (the pull-out direction of the seat belt 28) at the time of a frontal collision of the vehicle 12, that is, only a certain amount of pulling-out of the seat belt 28 from the retractor 30, and applies a limit load (force limiter load) to the pulling-out. Further, the variable force limiter mechanism 36 can change the force limiter load that the occupant P receives from the seat belt 28 at the time of a frontal collision of the vehicle 12. The change of the force limiter load may be any of stepless or multiple steps of two, three, or more steps. As the variable force limiter mechanism 36, conventionally known force limiter mechanisms disclosed in, for example, Japanese Patent Application Laid-Open Nos. 2013-103603, 2016-165994, 2018-075877, 2018-131168, and 2006-062632 can be applied. The operation of the variable force limiter mechanism 36 is controlled by the ECU 58 described later. It should be noted that a specific configuration of the variable force limiter mechanism 36 is not a main part of the present embodiment and, therefore, description thereof is omitted.

The airbag device 46 is a driver's seat airbag device that is mounted on a steering device 13 of the vehicle 12, and includes an airbag 48 sewn in a bag shape, and an inflator 50 (see FIG. 2; not shown in FIG. 1) that supplies inflation gas into the airbag 48. At normal times, the airbag 48 is modularized together with the inflator 50 in a folded state, and is covered with a wheel pad 13B that is provided at a central part of a steering wheel 13A. The airbag 48 is inflated by the pressure of gas generated from the inflator 50, and is deployed to the rear side of the steering wheel 13A, that is, toward the front of the occupant P (see the two-dot chain line in FIG. 1). When the airbag 48 is deployed, the wheel pad 13B is broken at a tear line (thin portion). The operation of the inflator 50 is controlled by the ECU 58.

The ECU 58 is configured from a microcomputer that includes a Central Processing Unit (CPU) 58A, a Random Access Memory (RAM) 58B, and a Read Only Memory (ROM) 58C, and a program 58C1 stored in the ROM 58C is output to the RAM 58B and is executed by the CPU 58A. As shown in FIG. 2, the pretensioner mechanism 34, the variable force limiter mechanism 36, and the inflator 50 are electrically connected to the ECU 58. In addition, a collision sensor 60, a slide position detection sensor 54, and a reclining angle detection sensor 56 are electrically connected to the ECU 58.

The collision sensor 60 includes, for example, a front-rear acceleration sensor that detects acceleration in the front-rear direction of the vehicle 12, and a left-right acceleration sensor that detects acceleration in the left-right direction (vehicle width direction) of the vehicle 12. The ECU 58 is configured to operate the inflator 50 and the pretensioner mechanism 34 when a frontal collision of the vehicle 12 is detected based on an output from the collision sensor 60. It should be noted that, for example, the ECU 58 may be configured to predict a frontal collision of the vehicle 12 based on an output from a pre-crash sensor that includes at least one of a vehicle exterior camera, a millimeter-wave radar, or an infrared laser.

The slide position detection sensor 54 is provided, for example, at the slide mechanism 22, and is configured to detect (calculate) the front-rear slide position of the vehicle seat 14 based on the number of rotations of the motor of the slide mechanism 22. The reclining angle detection sensor 56 is provided, for example, at the reclining mechanism 24, and is configured to detect (calculate) the reclining angle of the seat back 18 based on the number of rotations of the motor of the reclining mechanism 24. The slide position detection sensor 54 and the reclining angle detection sensor 56 configure a seating position detection unit 52 that detects the seating position at which the occupant P is seated. It should be noted that the slide position detection sensor 54 and the reclining angle detection sensor 56 may be an electric resistance type, an optical type, or a laser type distance meter or the like.

The ECU 58 is configured to reduce the force limiter load of the variable force limiter mechanism 36 if, compared to when the occupant P is positioned within a standard seating region, a seating position of the occupant P detected by the seating position detection unit 52 is further to the vehicle rear than the standard seating region and within an airbag protection region in which the occupant P is protected by the airbag 48 that deploys at the time of a frontal collision of the vehicle 12.

The standard seating region is a region that is determined when designing the vehicle 12, and is determined on the assumption that an occupant P having a standard physical size (see FIG. 1 and FIG. 3) is seated on the vehicle seat 14. The position of the vehicle seat 14 in the front-rear direction and the vertical direction with respect to the vehicle body is determined by the standard seating region. An occupant P having a standard physical size has an average adult male physical size, and has, for example, a physical size equivalent to a dummy doll of "Hybrid-III AM50" (height 175 cm, weight 78 kg).

When the occupant P having a standard physical size manually drives the vehicle 12 in a standard sitting posture (see occupant P shown in FIG. 1 and occupant P1 shown by a solid line in FIG. 3), the occupant P is positioned in the standard seating region. For this reason, in the present embodiment, the ECU 58 is configured to detect the standard seating region (standard seating position) based on the seating position of the occupant P during manual driving of the vehicle 12. Further, in this case, the ECU 58 detects the position of the head H of the occupant P based on the detection result of the seating position detection unit 52, and the force limiter load is reduced in accordance with an increase in distance in the vehicle front-rear direction between an interior component (here, the steering device 13) positioned in front of the occupant P and the head H.

Figure 3:
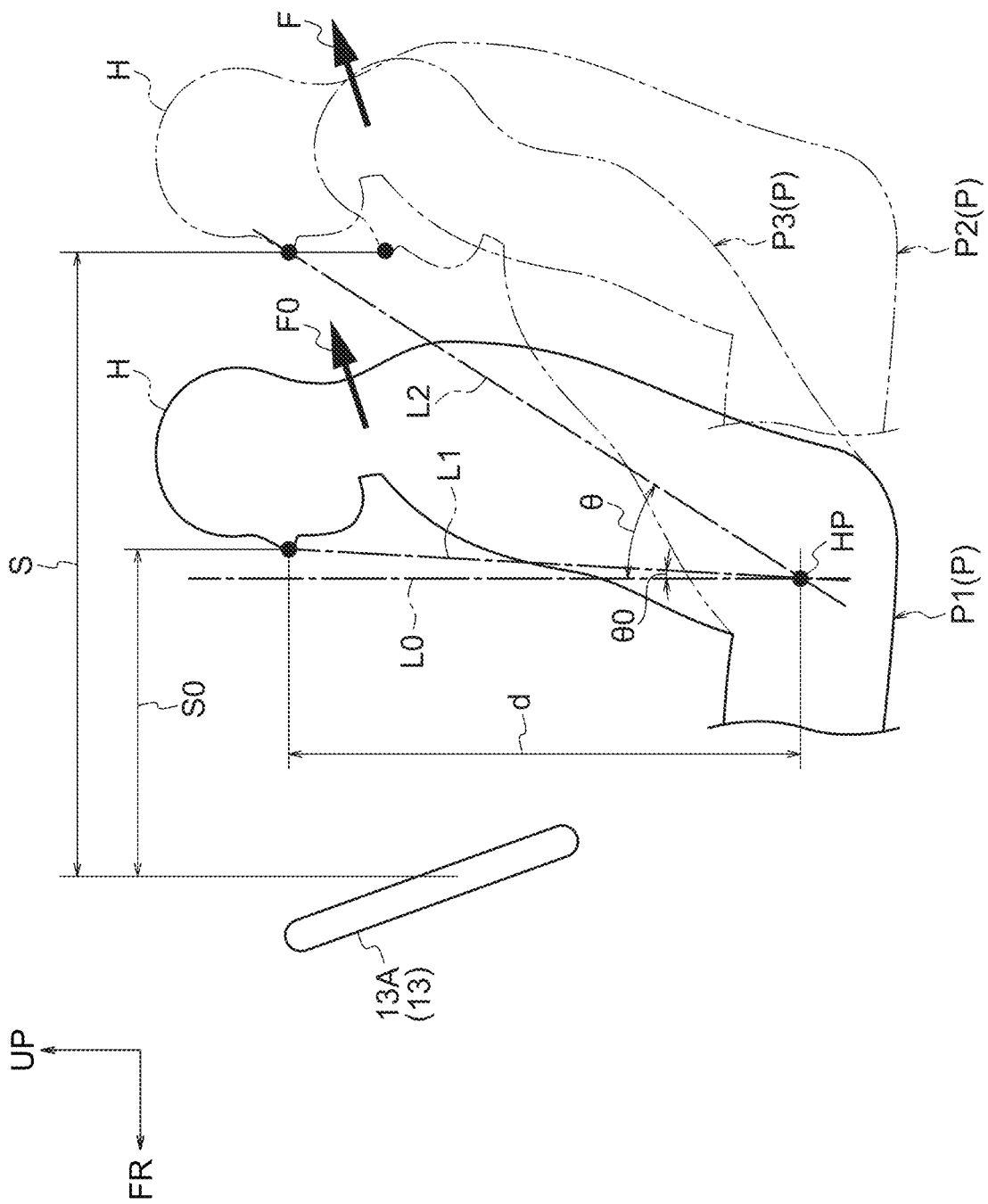
FIG. 3 is a side view corresponding to a part of FIG. 1, and is a diagram for explaining the relationship between the distance in the vehicle front-rear direction between the occupant's head and s steering device and the force limiter load.

The above "increase in distance" occurs, for example, when the occupant P takes a posture further to the vehicle rear than the standard seating region during automatic driving (see the occupants P2 and P3 indicated by the two-dot chain line in FIG. 3). It should be noted that the occupant P2 in FIG. 3 is seated in the vehicle seat 14 (not shown in FIG. 3) in a state in which the seat back 18 is slid further to the vehicle rear than the standard seating region and is set at the same reclining angle as during manual driving. Further, the occupant P3 in FIG. 3 is seated in the vehicle seat 14 (not shown in FIG. 3) in a state in which the seat back 18 is disposed at the same front-rear slide position as during manual driving and is reclining further to the vehicle rear than during manual driving. These occupants P2, P3 are located within the airbag protection region described above. For this reason, if the vehicle 12 has a frontal collision during automatic driving in which the occupant P has the above-described posture (hereinafter referred to as "backward posture"), the ECU 58 is configured to reduce the force limiter load of the variable force limiter mechanism 36 as described above.

That is, if the vehicle 12 has a frontal collision in a state in which the occupant P is in the backward posture and is located within the airbag protection region, the occupant P does not collide with the steering device 13 (interior component) and an impact absorption stroke, which can move toward the vehicle front, becomes larger than that during manual driving. For this reason, the ECU 58 is configured to reduce the force limiter load in accordance with the increase in the impact absorption stroke.

Specifically, as shown in FIG. 3, in a case in which a distance in the vehicle front-rear direction between the head H of the occupant P and the steering device 13 during manual driving is S0, a distance in the vehicle front-rear direction between the head H of the occupant P and the steering device 13 during automatic driving is S, and the force limiter load during manual driving is F0, the ECU 58 sets a force limiter load F during automatic driving such that an energy absorption amount of the occupant P when a frontal collision occurs during manual driving (F0×S0) and an energy absorption amount of the occupant P in the backward posture when a frontal collision occurs during automatic driving (F×S) is the same (F=F0×S0/S).

The distance S described above is, for example, set to an amount of sliding movement s toward the vehicle rear of the head H (vehicle seat 14) added to a movement amount r of the head H toward the vehicle rear due to an increase in the reclining angle of the seat back 18, with respect to the distance S0(S=S0+s+r). In a case in which the movement amount r is a distance d from the hip point HP of the occupant P to the head H of the occupant P (here, the tip of the nose), the reclining angle during manual driving is θ0, and in a case in which a reclining angle when the occupant P reclines the seat back 18 further to the vehicle rear 18 than during manual driving is θ, r is calculated as r=d×sin(θ-θ0). In the present embodiment, the angles θ0 and θ are angles formed by virtual straight lines L1, L2 that pass through the hip point HP of the occupant P and the head H of the occupant P (here, the tip of the nose), in the side view of the vehicle 12, with respect to a virtual straight line L0 extending in the vertical direction of the vehicle. Further, in the present embodiment, the distances S0 and S are distances in the vehicle front-rear direction from the center of the steering wheel 13A to the head H of the occupant P (here, the tip of the nose).

Figure 4:
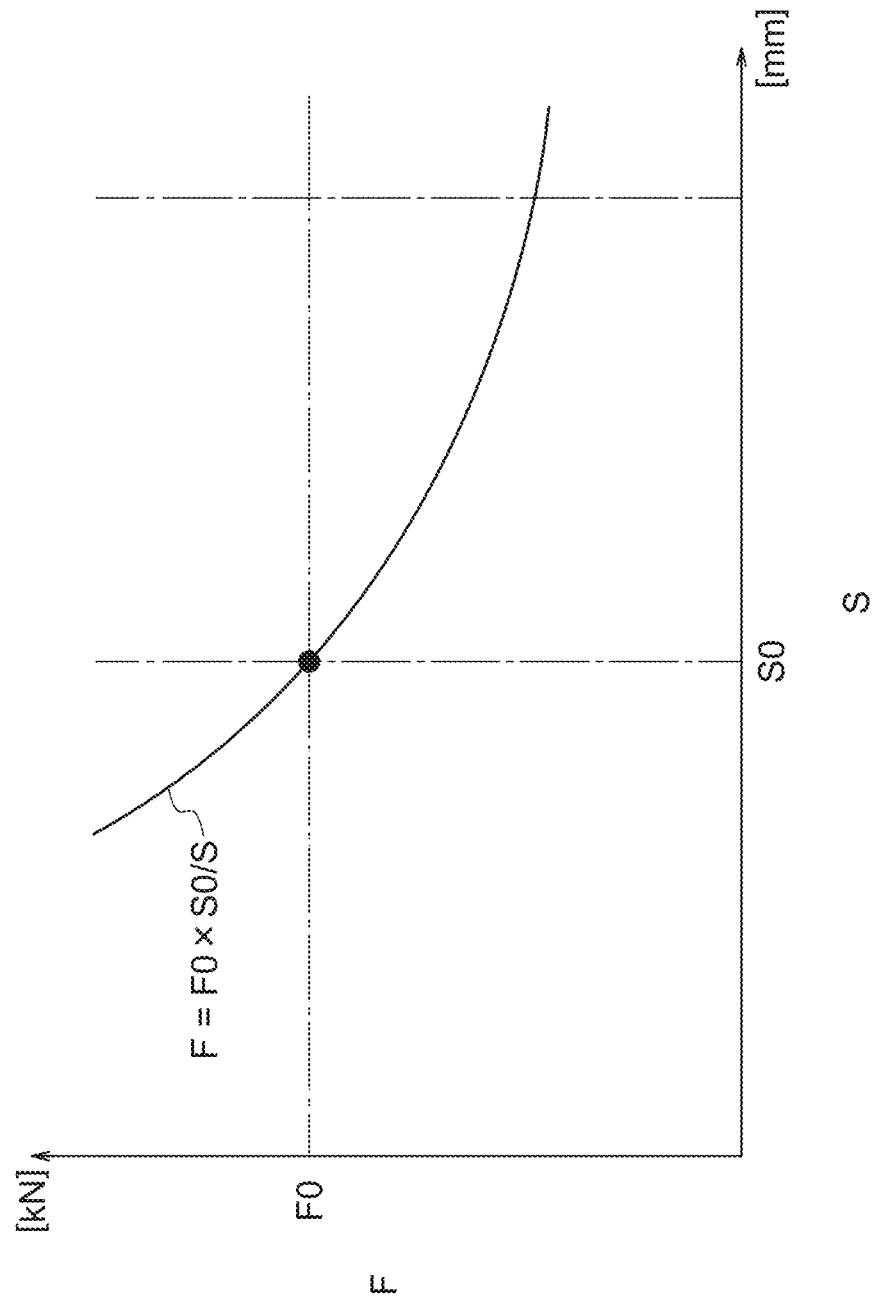
FIG. 4 is a diagram showing an example in which the force limiter load changes steplessly in accordance with the distance in the vehicle front-rear direction between the occupant's head and the steering device.

Here, for example, in the present embodiment, when the variable force limiter mechanism 36 can change the force limiter load F steplessly, the ECU 58 changes the force limiter load F so as to satisfy the relationship $F=F0\times S0/S$ as shown in FIG. 4.

Figure 5:
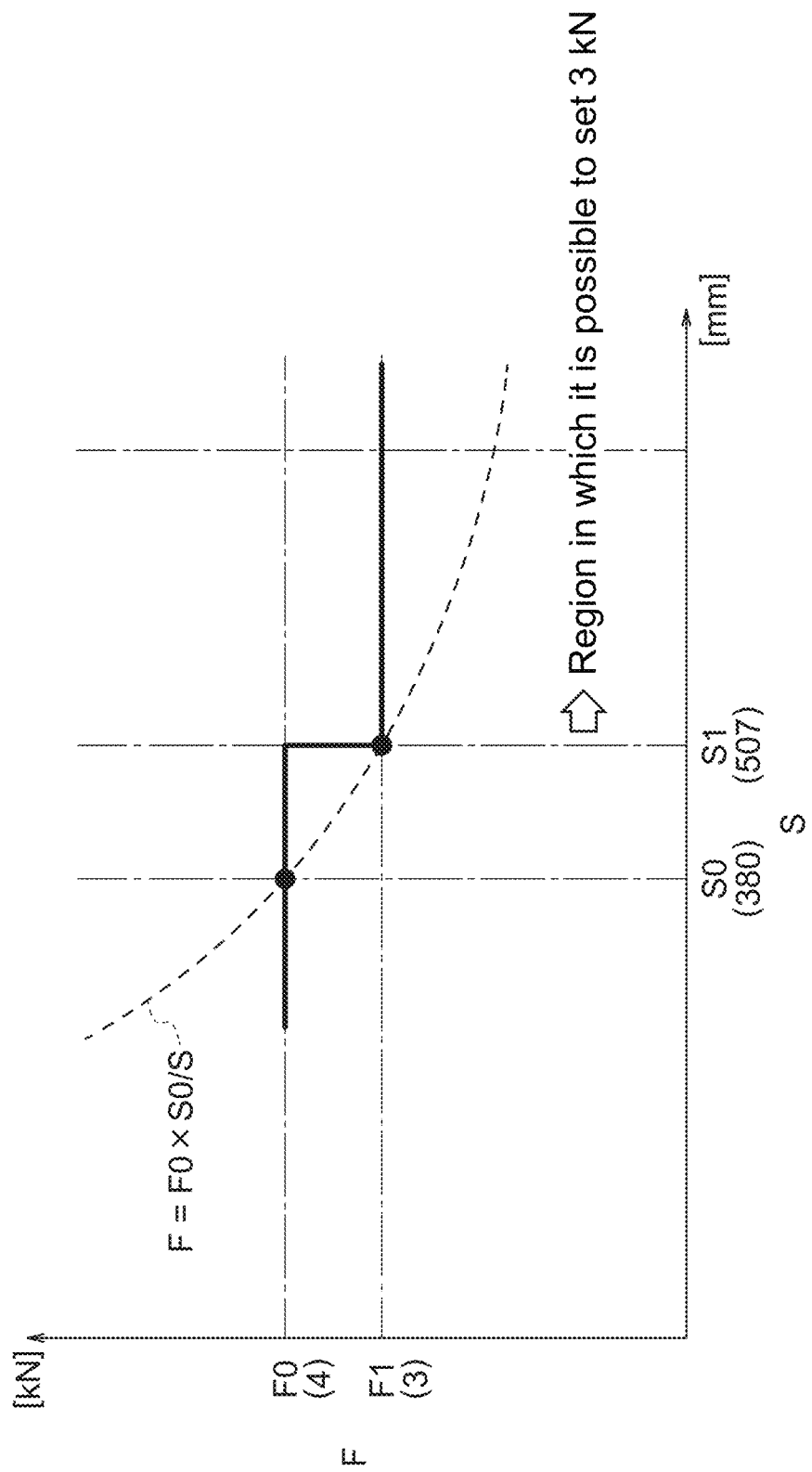
FIG. 5 is a diagram showing an example in which the force limiter load changes in two stages in accordance with the distance in the vehicle front-rear direction between the occupant's head and the steering device.

Further, for example, in the present embodiment, when the variable force limiter mechanism 36 can change (switch) the force limiter load between the high load F0 and the low load F1 in two stages, and the ECU 58 makes the force limiter load the high load F0 in a state in which $S \leq S0 \times F0/F1=S1$, and makes the force limiter load the low load F1 in a state in which $S>S0\times F0/F1=S1$, as shown in FIG. 5. That is, for example, if the high load F0 is 4 kN, the low load F1 is 3 kN, and S0 is 380 mm, the force limiter load is reduced to 3 kN in a state in which S>507 mm. In this case, a region where $S>S0\times F0/F1=S1$ is a region further to the vehicle rear than the standard seating region.

Further, although not shown, the ECU 58 is configured to switch the force limiter load in multiple steps so as to satisfy the relationship $F=F0\times S0/S$ when the variable force limiter mechanism 36 can change (switch) the force limiter load in multiple steps of three or more steps.

(Operation and Effects)

Next, the operation and effects of the present embodiment are described.

In the vehicle occupant protection device 10 configured as described above, the variable force limiter mechanism 36 included in the seat belt device 26 can change the force limiter load that the occupant P receives from the seat belt at the time of a frontal collision of the vehicle 12. Further, the airbag device 46 deploys the airbag toward the front of the occupant P at the time of a frontal collision of the vehicle 12, and the seating position detection unit 52 detects the seating position in which the occupant P is seated. Then, the ECU 58 reduces the force limiter load if, compared to when the occupant P is positioned within the standard seating region, a seating position of the occupant P detected by the seating position detection unit 52 is further to the vehicle rear than the standard seating region and within the airbag protection region in which the occupant P is protected by the airbag 48 that deploys.

That is, since a larger amount of forward movement of the occupant P with respect to the vehicle 12 (that is, impact absorption stroke) can be ensured in a case in which the seating position of the occupant P is further to the vehicle rear than the standard seating region, than a case in which the seating position of the occupant P is within the standard seating region, the ECU 58 reduces the force limiter load. As a result, since the load that the chest region of the occupant P receives from the seat belt 28 (specifically, the shoulder belt 28A) is reduced, occupant protection performance can be improved.

Further, in the present embodiment, the vehicle 12 is an autonomous driving vehicle 12 that can be switch between automatic driving and manual driving, and the occupant P is a driver of the autonomous driving vehicle 12. The ECU 58 is configured to detect the standard seating region based on the seating position of the occupant P during manual driving. When the above-described autonomous driving vehicle 12 is automatically driving, the occupant P can take the backward posture at further to the vehicle rear than the standard seating region (see occupants P2 and P3 in FIG. 3). At that time, the force limiter load is reduced to less than when the occupant P is positioned in the standard seating region. As a result, even when a frontal collision occurs during automatic driving, the load that the chest region of the occupant P in the backward posture receives from the seat belt 28 is reduced.

Moreover, in the present embodiment, the seating position detection unit 52 includes the slide position detection sensor 54 that detects the front-rear slide position of the vehicle seat 14 and the reclining angle detection sensor 56 that detects the reclining angle of the seat back 18. Further, the ECU 58 detects the position of the head H of the occupant P based on the above-described front-rear slide position and the reclining angle. As a result, the position of the head H of the occupant P can be detected by a simple configuration.

Further, in the present embodiment, the ECU 58 reduces the force limiter load in accordance with an increase in the distance S in the vehicle front-rear direction between the interior component (the steering device 13) positioned in front of the occupant P and the head H of the occupant P ($F=F0\times S0/S$). That is, since the force limiter load is reduced in accordance with the increase of the impact absorbing stroke described above, an impact absorption amount can be kept constant ($F0\times S0=F\times S$).

In the above-described embodiment, although the ECU 58 is configured to detect the seating position of the occupant P (the position of the head H) based on both the front-rear slide position of the vehicle seat 12 that is detected by the slide position detection sensor 54 and the reclining angle of the seat back 18 that is detected by the reclining angle detection sensor 56, the present disclosure is not restricted to this. That is, for example, in a case in which the sliding range of the vehicle seat in the vehicle front-rear direction is narrow, the ECU 58 may be configured to detect the seating position of the occupant P based only on the reclining angle. Further, for example, in a case in which the reclining range of the vehicle seat is narrow, the ECU 58 may be configured to detect the seating position of the occupant P based only on the front-rear slide position. By configuring in this manner, the mass and the cost of the omitted sensor can be reduced.

In the above-described embodiment, although the ECU 58 is configured to detect the position of the head H of the occupant P based on the front-rear slide position and the reclining angle (that is, the position of the vehicle seat 14), the present disclosure is not limited to this. That is, for example, the position of the head H may be detected by an in-vehicle camera 62 (see FIG. 1) that captures the occupant P. In this case, the in-vehicle camera 62 serves as the seating position detection unit. In such a configuration, for example, the position of the head H can be accurately detected even when the occupant P is seated with the upper body upright despite the seat back 18 being significantly reclined. As a result, control of changing the force limiter load change control can be performed more accurately.

In the above embodiment, although the force limiter load is similarly changed by an increase in the distance between the head H and the steering device 13 whether this be due to a change in the front-rear slide position or due to an increase in the reclining angle, the present disclosure is not limited to this. For example, when the increase in the above-described distance is due to an increase in the reclining angle, the force limiter load may be set higher than in the case in which the above-described distance is due to the front-rear slide position moving toward the vehicle rear in the vehicle front-rear direction. That is, since the load that the chest region of the occupant P receives from the shoulder belt 28A at a time of frontal collision lowers when the reclining angle of the seat back 18 of the vehicle seat 14 is increased, the occupant restraining force of the seat belt 28 can be improved, while ensuring occupant protection performance, by setting the force limiter load higher in the manner described above.

Figure 6:
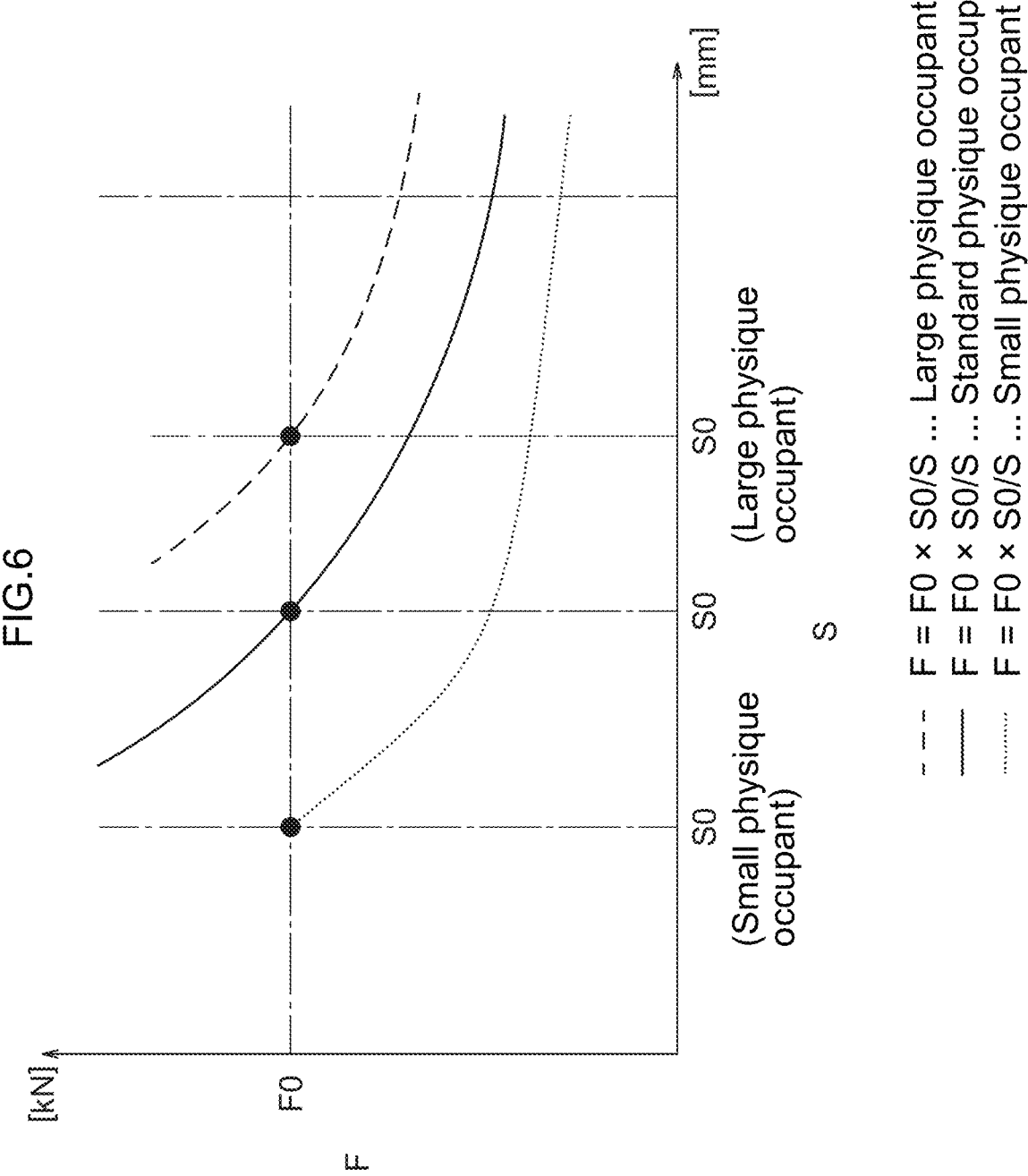
FIG. 6 is a diagram showing an example in which a detection result of the position of the head based on the estimated physical size of the occupant is corrected when the force limiter load changes steplessly in accordance with the distance in the vehicle front-rear direction between the occupant's head and the steering device.

In the above embodiment, although the ECU 58 is configured to detect the standard seating region based on the seating position when the occupant P having a standard physical size is manually driving the vehicle 12, the present disclosure is not limited to this. For example, in addition to the ECU 58 estimating the physical size of the occupant P based on the front-rear slide position during manual driving, the ECU 58 may be configured to correct a detection result (the values of S0 and d in FIG. 3) of the position of the head H based on the estimated physical size. In this case, as shown in FIG. 6, a curve line of F=F0×S0/S changes in accordance with the occupant's physical size. As a result, it becomes possible to change the force limiter load more finely in accordance with an occupant's physical size.

Moreover, although the case in which the occupant P is the driver is described in the above embodiment, the present disclosure in not limited to this. That is, for example, when an in-vehicle camera capable of imaging a passenger seat occupant is used as the seating position detection unit, the standard seating region of the passenger seat occupant, which is determined for each physical size of the passenger seat occupant, is stored in the control unit in advance, and when the passenger seat occupant is seated further to the vehicle rear than the standard seating region and within the protection region of the passenger seat occupant by a passenger seat airbag, the force limiter load of the seat belt device of the passenger seat may be reduced. In this case, for example, an instrument panel on which the passenger seat airbag device is mounted is an "interior component" in the present disclosure.

Moreover, although the case in which the vehicle 12 is an autonomous driving vehicle is described in the above embodiment, the present disclosure is not limited to this, and the vehicle occupant protection device according to the present disclosure can also be applied to a vehicle that cannot perform autonomous driving.

Various other modifications may be implemented within a range not departing from the gist of the present disclosure. Further, obviously the scope of rights of the present disclosure is not limited to the above exemplary embodiments.

What is claimed is:

1. A vehicle occupant protection device, comprising:
   a seat belt device having a variable force limiter mechanism that is capable of changing a force limiter load that an occupant who is sitting on a vehicle seat receives from a seat belt at a time of a frontal collision of a vehicle;
   an airbag device that deploys an airbag in front of the occupant at the time of the frontal collision;
   a seating position detection unit that detects a seating position of the occupant; and
   a control unit that reduces the force limiter load if, compared to a case in which the occupant is positioned within a standard seating region, the seating position of the occupant detected by the seating position detection unit is further toward a vehicle rear than the standard seating region and is within an airbag protection region in which the occupant is protected by the airbag.

2. The vehicle occupant protection device according to claim 1, wherein:
   the vehicle is an autonomous driving vehicle that is capable of switching between automatic driving and manual driving;
   the occupant is a driver of the autonomous driving vehicle; and
   the control unit detects the standard seating region based on the seating position of the occupant during manual driving.

3. The vehicle occupant protection device according to claim 2, wherein:
   the seating position detection unit detects at least one of a front-rear slide position of the vehicle seat or a reclining angle of the vehicle seat in which the occupant is seated; and
   the control unit detects a position of a head of the occupant based on a detection result of the seating position detection unit.

4. The vehicle occupant protection device according to claim 3, wherein the control unit reduces the force limiter load in accordance with an increase in a distance in a vehicle front-rear direction between an interior component positioned in front of the occupant and the head of the occupant.

5. The vehicle occupant protection device according to claim 4, wherein:
   the seating position detection unit detects both the front-rear slide position and the reclining angle; and
   the control unit sets the force limiter load higher in a case in which the increase in the distance is due to an increase in the reclining angle, than in a case in which the increase in the distance is due to the front-rear slide position moving toward a vehicle rear in the vehicle front-rear direction.

6. The vehicle occupant protection device according to claim 4, wherein:
   the seating position detection unit detects at least the front-rear slide position; and
   the control unit estimates a physical size of the occupant based on the front-rear slide position during manual driving, and corrects a detection result of the position of the head of the occupant based on the estimated physical size.

7. The vehicle occupant protection device according to claim 1, wherein, in a case in which a distance in a vehicle front-rear direction between a head of the occupant seated in the standard seating region and an internal component positioned in front of the occupant is S0, a distance in the vehicle front-rear direction between the head of the occupant positioned further to the vehicle rear than the standard seating region and the internal component is S, the force limiter load is F0 in a state in which the occupant is positioned in the standard seating region, and the force limiter load is F in a state in which the occupant is positioned further to the vehicle rear than the standard seating region, the control unit changes the force limiter load so as to satisfy a relationship of F=F0×S0/S.

8. The vehicle occupant protection device according to claim 1, wherein:
   the vehicle seat includes a seat cushion coupled to a floor portion of the vehicle via a slide mechanism, and a seat back having a lower end portion that is coupled to a rear end portion of the seat cushion via a reclining mechanism, and
   the seat belt device includes a retractor disposed on the seat back of the vehicle seat, and the seat belt, one end portion of the seat belt being locked at the seat cushion or the slide mechanism and another end portion of the seat belt being locked at a take-up shaft of the retractor.

9. The vehicle occupant protection device according to claim 1, wherein the seating position detection unit is an in-vehicle camera that images the occupant.

* * * * *